United States Patent
Shah et al.

(10) Patent No.: US 9,906,522 B2
(45) Date of Patent: Feb. 27, 2018

(54) METHOD OF USING TEXT AND PICTURE FORMATTING OPTIONS SUCH AS FONT, FONT SIZE, FONT COLOR, SHADING, FONT STYLE, FONT EFFECTS, FONT UNDERLINE, CHARACTER EFFECTS AS PART OF ELECTRONIC SIGNATURE

(71) Applicant: Dhavalkumar Shah, Old Bridge, NJ (US)

(72) Inventors: Dhavalkumar Shah, Old Bridge, NJ (US); Nehal Mehta, Old Bridge, NJ (US)

(73) Assignee: Dhavalkumar Shah, Old Bridge, NJ (US)

( * ) Notice: Subject to any disclaimer, the term of this patent is extended or adjusted under 35 U.S.C. 154(b) by 0 days.

(21) Appl. No.: 15/222,663

(22) Filed: Jul. 28, 2016

(65) Prior Publication Data

US 2017/0061161 A1 Mar. 2, 2017

Related U.S. Application Data

(62) Division of application No. 14/839,162, filed on Aug. 28, 2015, now Pat. No. 9,536,069.

(51) Int. Cl.
| | |
|---|---|
| H04L 29/06 | (2006.01) |
| G06F 21/31 | (2013.01) |
| G06F 21/62 | (2013.01) |
| G06F 21/64 | (2013.01) |
| G06F 17/21 | (2006.01) |
| G06K 9/00 | (2006.01) |

(52) U.S. Cl.
CPC .......... *H04L 63/083* (2013.01); *G06F 17/211* (2013.01); *G06F 21/31* (2013.01); *G06F 21/6209* (2013.01); *G06F 21/64* (2013.01); *H04L 63/0861* (2013.01); *G06K 9/00154* (2013.01); *G06K 9/00161* (2013.01); *G06K 9/00167* (2013.01); *H04L 2463/082* (2013.01)

(58) Field of Classification Search
CPC ............ H04L 63/0861; G06K 9/00154; G06K 9/00161; G06K 9/00167
See application file for complete search history.

(56) References Cited

U.S. PATENT DOCUMENTS

| | | | |
|---|---|---|---|
| 2010/0031048 A1* | 2/2010 | Koziol | G06F 21/6218 713/176 |
| 2012/0246303 A1* | 9/2012 | Petersen | G06F 17/30144 709/224 |
| 2013/0054433 A1* | 2/2013 | Giard | H04L 67/22 705/34 |
| 2015/0195092 A1* | 7/2015 | Bartkiewicz | H04L 9/3247 713/176 |
| 2015/0242382 A1* | 8/2015 | Pravetz | G06F 17/212 715/268 |
| 2015/0280921 A1* | 10/2015 | Geoffrey | H04L 9/0866 713/176 |
| 2016/0057124 A1* | 2/2016 | Boyle | H04L 63/0861 726/7 |
| 2016/0162442 A1* | 6/2016 | Esgar | G06F 17/30011 715/249 |
| 2016/0283777 A1* | 9/2016 | Holden | G06K 9/00154 |

\* cited by examiner

*Primary Examiner* — James R Turchen

(57) ABSTRACT

We propose a method that uses formatting options of Font, Font Size, Font Color, Shading, Font Style, Font Effects, Font Underline, and Character Effects as a part of electronic signature.

6 Claims, 3 Drawing Sheets

Flowcharts
Fig. 1. Electronic Signature using formatting options, no validation against any signature stored earlier. This workflow is for scenarios where signatures are accepted on good faith.
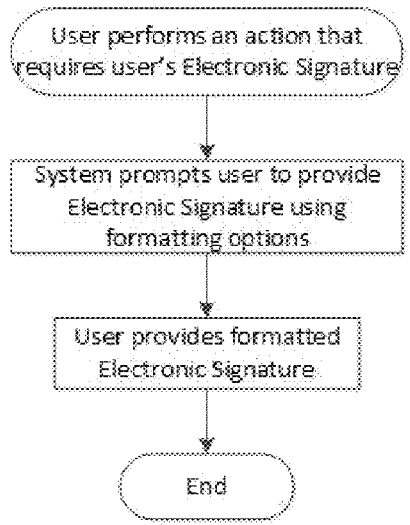

Fig. 2. Electronic Signature compared with configured earlier by user
User asked to provide his formatted electronic signature based on formatting options that he remember when he originally configured electronic signatures. If match occurs action is allowed.
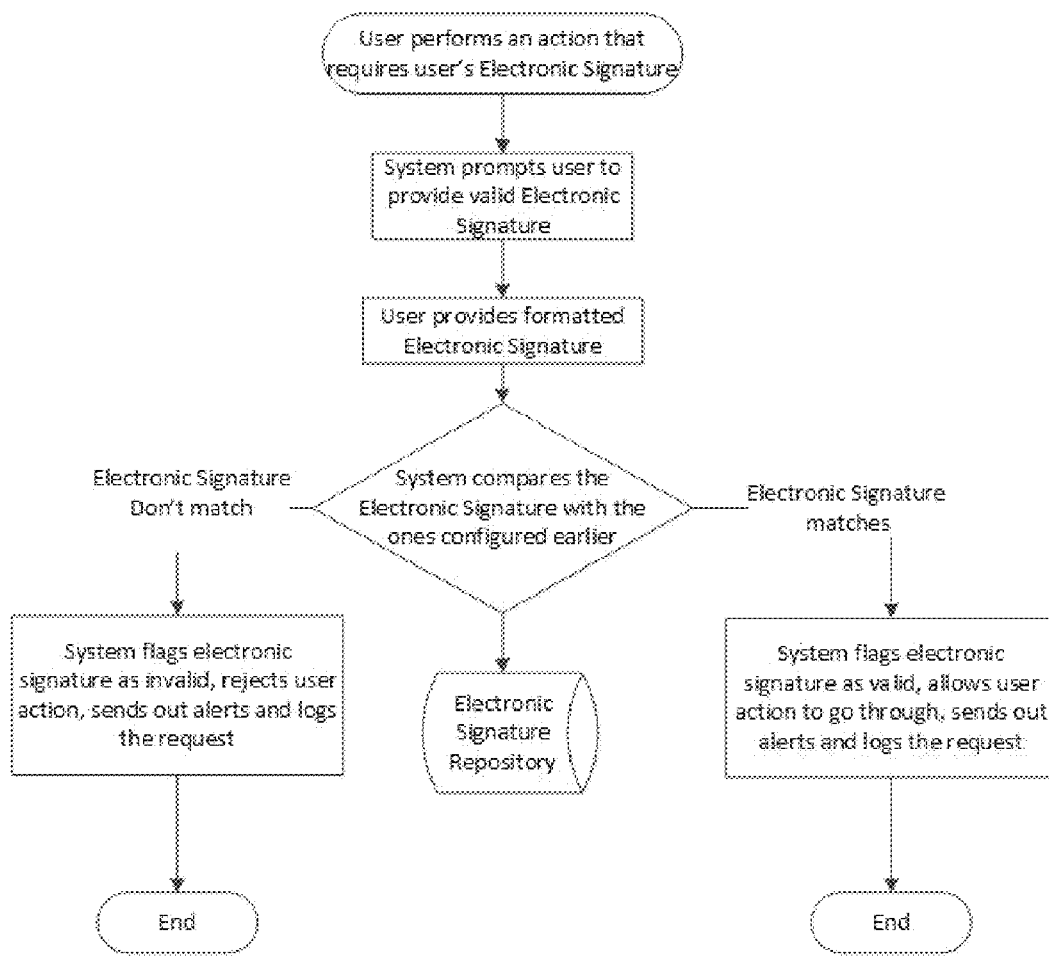

Fig. 3. Electronic Signature using formatting options
User asked to format signature using formatting options sent to user. If match occurs action is allowed.
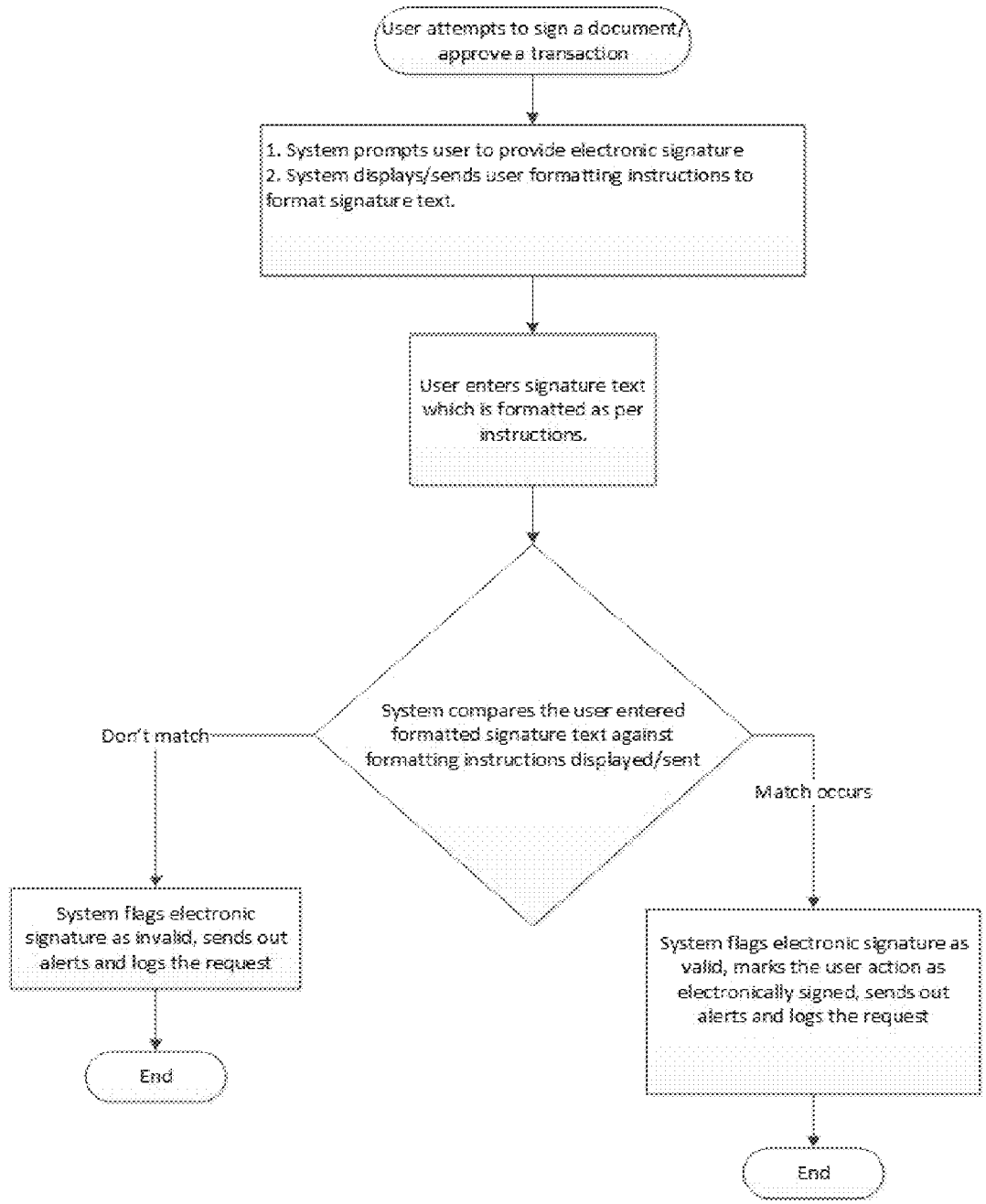

METHOD OF USING TEXT AND PICTURE FORMATTING OPTIONS SUCH AS FONT, FONT SIZE, FONT COLOR, SHADING, FONT STYLE, FONT EFFECTS, FONT UNDERLINE, CHARACTER EFFECTS AS PART OF ELECTRONIC SIGNATURE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM, LISTING COMPACT DISC APPENDIX

Not Applicable

BACKGROUND OF THE INVENTION

The proposed invention concerns security. In particular, proposed method is to provide/improve/strengthen security for electronic signatures required for actions on individual's any kind of data, information, credit, finances, services obtained (online and or offline), using formatting options.

Users are required to provide electronic signatures, when they do certain actions in software applications and websites for bank accounts, view and edit data, use cloud hosted applications, make purchases, make approvals, make rejections or make comments for example.

In spite of many new means to do signature electronically, plain text based signature and password-based user signature is still widely used by installed software applications, smartphone apps, websites and web services due to its convenience, and ease in use and deployment. With ever growing instances of passwords and credentials getting compromised its necessary to invent strong mechanism which is multi-dimensional but at the same time simple enough for users to work with.

In password-based user signatures users are required to input textual password to identify them as valid user performing the action. Now because of its simplicity passwords are prone to hacking. Users are always asked to increase complexity of their passwords which leads to user forgetting them often and as a result instances user getting locked out of their own accounts.

BRIEF SUMMARY OF THE INVENTION

We propose methods which fortifies, simplifies electronic signature and gives user ample options to personalize it. It gives users formatting options to personalize it.

As per our method, user can format signature by choosing combination of one or more font color for each character or word in password. User can also apply one or more factor of Font, Font Size, Font Color, Shading, Font Style, Font Effects, Font Underline and Character effects for each character or word in signature.

Our method increases the complexity of the user signature but at the same time keeps it simple to remember and use.

For Electronic signature user can provide their name or initials that is formatted in the same way as his sample electronic signatures provided earlier to the system or as per formatting instructions sent to him. This is not same as real hand drawn signature but lot of improvement upon basic non formatted text entry of name or initials.

BRIEF DESCRIPTION OF THE SEVERAL VIEWS OF THE DRAWING

Flowcharts

FIG. 1. Electronic Signature using formatting options, no validation against any signature stored earlier. This workflow is for scenarios where signatures are accepted on good faith.

FIG. 2. Electronic Signature compared with configured earlier.

User asked to provide his formatted electronic signature based on formatting options that he remember when he originally configured electronic signatures. If match occurs action is allowed.

FIG. 3. Electronic Signature using formatting options

User asked to format signature using formatting options sent to user. If match occurs action is allowed.

DETAILED DESCRIPTION

Given below are the examples of user choosing different factor values for different characters in his signature text.
  a. Example of User choosing different colors for different characters: We-are-2Happy !
    Here "We-" is colored in blue, "are-2" colored in red, "H" colored in Green, "app" colored in pink and "y!" colored in black.
  b. Example of User choosing different fonts for different characters: We-are-2Happy!
    Here "We-" is having Font Arial, "are-2" is having Font Lucida Handwriting, "H" is having Font Arial Black, "app" is having Font Tempus Sans ITC and "y!" is having Font Broadway.
  c. Example of User choosing different font sizes for different characters: We-are-2Happy!
    Here "We-" is having Font size 11, "are-2" is having Font size 16, "H" is having Font size 8, "app" is having Font size 14 and "y!" is having Font size 9.
  d. Example of User choosing different font styles for different characters: We-are-2Happy!
    Here "We-" is not having Font style "Regular", "are-2" is having Font style "Bold", "H" is having Font style "Italic", "appy!" is having Font style "Bold Italic".
  e. Example of User choosing different font effects for different characters: We-ARE-not-very-HAPPY.
    Here "We-" is having Font effect "Superscript", "are-" is having Font effect "small caps", "not" is having Font effect "Strikethrough", "very-" is having Font effect "Double Strikethrough", HAPPY! is having Font effect ALL CAPS.
  f. Example of User choosing different font underline style for different characters: We-are-2Happy
    Here "We-are-" is having no Font underline style, "2Happy" is having Font Underline style.
  g. Example of User choosing different shading for different characters:

Here "We-2-are-" is having shading of dark black, "very-" is having shading of turquoise and "Happy!" is having shading of brick red.

Given below is the example of user using combination of factors of font, font style, font size and font color. User can configure one or more set of factors for signature characters.

E.g. *MySecretCode1* on Monday, Wednesday, Friday and MySecretCode2 on the rest of the days of the week.

These formatting options gives lot of choice and flexibility to users and at the same time makes it very difficult for hackers to steal, store and use stolen signature information.

The invention claimed is:

1. A computer-implemented process of accepting electronic signature from user that is personalized using formatting options, the process comprising:
using a computing device to perform the steps of:
capturing signature text from user which are formatted using formatting options, wherein signature text comprise user name, user initials, user identifier, user pin or any other text assigned or sent to user that identifies the user, and wherein the formatting options comprise Font, Font Size, Font Color, Shading, Font Style, Font Effects, Font Underline, and character effects;
sending formatting instructions to the user to format signature text;
comparing the captured formatted signature text against system generated formatted signature text using same formatting options that user is instructed to use;
flagging the captured electronic signature as valid if match occurs and marking the user action as electronically signed, flagging the captured electronic signature as invalid and rejecting it to mark as signed if match doesn't occur;
alerting the user via alert communication methods chosen by the user including email, text message, voice message, voice call, SMS, audible alarm, or visual clues; and
logging the user action, process steps and its outcome.

2. The process of claim 1, wherein the user action is a document approval, work flow step approval, transaction approval, approval of data changes, approval of action taken during the course of business or approval of action taken during usage of software application, program or software service.

3. An apparatus comprising:
one or more processors;
a memory storing instructions that when executed by the one or more processors perform the steps comprising:
using a computing device to perform the steps of:
capturing signature text from user which are formatted using formatting options, wherein signature text comprise user name, user initials, user identifier, user pin or any other text assigned or sent to user that identifies the user, and wherein the formatting options comprise Font, Font Size, Font Color, Shading, Font Style, Font Effects, Font Underline, and character effects;
sending formatting instructions to the user to format signature text;
comparing the captured formatted signature text against system generated formatted signature text using same formatting options that user is instructed to use;
flagging the captured electronic signature as valid if match occurs and marking the user action as electronically signed, flagging the captured electronic signature as invalid and rejecting it to mark as signed if match doesn't occur;
alerting the user via alert communication methods chosen by the user including email, text message, voice message, voice call, SMS, audible alarm, or visual clues; and
logging the user action, process steps and its outcome.

4. The apparatus of claim 3, wherein the user action is a document approval, work flow step approval, transaction approval, approval of data changes, approval of action taken during the course of business or approval of action taken during usage of software application, program or software service.

5. A non-transitory computer-readable medium having instructions stored thereon executable by a computing platform to:
use a computing device to perform the steps of:
capture signature text from user which are formatted using formatting options, wherein signature text comprise user name, user initials, user identifier, user pin or any other text assigned or sent to user that identifies the user, and wherein the formatting options comprise Font, Font Size, Font Color, Shading, Font Style, Font Effects, Font Underline, and character effects;
send formatting instructions to the user to format signature text;
compare the captured formatted signature text against system generated formatted signature text using same formatting options that user is instructed to use;
flag the captured electronic signature as valid if match occurs and marking the user action as electronically signed, flagging the captured electronic signature as invalid and rejecting it to mark as signed if match doesn't occur;
alert the user via alert communication methods chosen by the user including email, text message, voice message, voice call, SMS, audible alarm, or visual clues; and
log the user action, process steps and its outcome.

6. The computer-readable medium of claim 5, wherein the user action is a document approval, work flow step approval, transaction approval, approval of data changes, approval of action taken during the course of business or approval of action taken during usage of software application, program or software service.

* * * * *